July 5, 1966

H. E. DURR 3,258,950

APPARATUS FOR SHEATHING CABLE CORES

Filed July 1, 1963

INVENTOR
H.E.DURR
BY
ATTORNEY

3,258,950
APPARATUS FOR SHEATHING CABLE CORES
Helmut E. Durr, Summit, N.J., assignor to Western Electric Company, Incorporated, New York, N.Y., a corporation of New York
Filed July 1, 1963, Ser. No. 291,982
2 Claims. (Cl. 72—176)

This invention relates to apparatus for sheathing cable cores, and particularly to apparatus for wrapping sheaths longitudinally about cores.

In forming certain types of cable, as illustrated in a patent to E. W. Reynolds et. al. 2,,764,214, strips of material are wrapped longitudinally about a cable core as the core is advanced longitudinally. Apparatus of this kind requires numerous units each having pairs of rollers and pulleys to control belts used in forming the strip material so as to bend it longitudinally about the core. Heretofore, in apparatus of this type, the rollers and pulleys of each unit were not capable of individual, fine adjustments for a cable core. Consequently, when the rollers and pulleys of each unit were simultaneously adjusted like distances to receive various size cables therethrough, any error regarding the initial position of any roller and/or pulley with one size cable would remain for cables of other sizes.

An object of the present invention is to provide a new and improved apparatus for sheathing cable cores which is extremely accurate and adjustable for cable cores of various sizes.

In accordance with the object, the invention comprises an apparatus for sheathing cable cores being advanced longitudinally which includes a plurality of units having rollers and belt controlling pulleys capable of initial, individual, fine adjustments and which may be further adjusted simultaneously for cable cores for various sizes.

Other objects and advantages will be apparent from the following detailed description when considered in conjunction with the accompanying drawings wherein.

Figure 1:
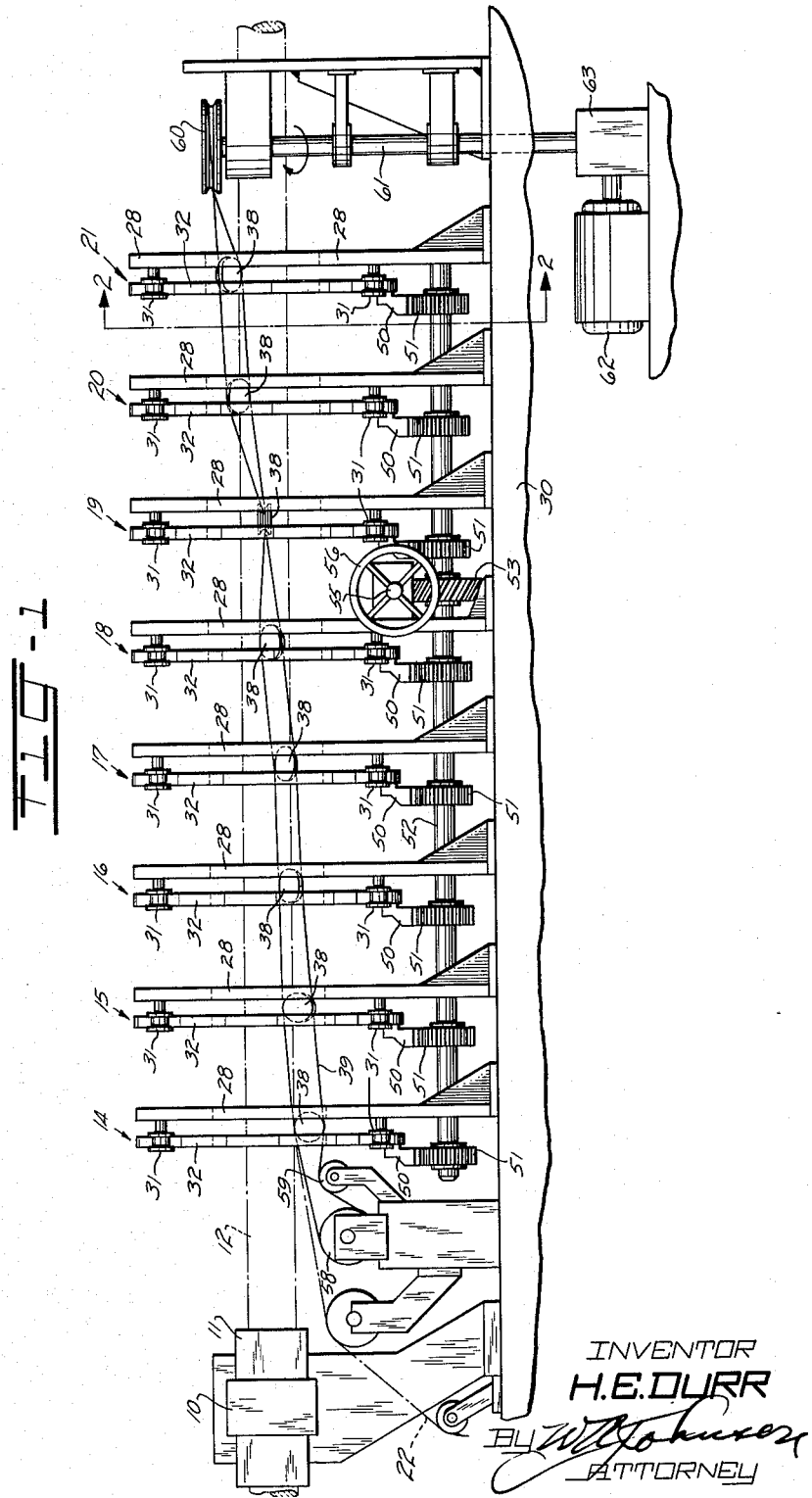
FIG. 1 is a side elevational view of the apparatus.

The apparatus includes a guide 10 having a removable die 11 for a cable core 12 of a predetermined size, and means (not shown) for advancing the cable core 12 longitudinally in a given path through the apparatus. The apparatus includes a plurality of units 14, 15, 16, 17, 18, 19, 20 and 21, which are substantially identical in structure with the exception of the positions of the guiding means thereof for a material 22 which is to be wrapped longitudinally about the cable core. Therefore, the description of the unit 21 and guiding means therein, shown in detail in FIGS. 2 and 3, should be sufficient for a clear understanding of the structure of the other units. The unit 21, shown in FIGS. 2 and 3, includes a pair of rollers 25 each mounted on slide-type individual carriages 26 movable radially in guides 27 mounted on a supporting bracket 28. The bracket 28 is mounted on a base 30 and carries rollers 31 with grooves in their peripheries to support an annular element 32. Each carriage 26 has an arm 34 with a dove-tail connection 35 and an adjusting means 36, such as a screw having one end connected to the arm, for permitting an initial fine adjustment for the roller 25 relative to the centerline of the path of each cable core. Through the adjusting means 36, the arm 34, in each instance, may be moved longitudinally relative to its carriage to bring about this desired adjustment.

In addition to the rollers 25, the unit 21 has a pair of pulleys 38 for a pair of endless belts 39. By viewing FIG. 1, it will be observed that the arrangement of the rollers and pulleys vary to bring about the conversion of the flat strip of material 22 into a cylindrical sheath while being wrapped longitudinally about the advancing cable core.

Each pair of pulleys 38 is provided with a pair of backup rollers 40 to prevent any possibility of the belts leaving the pulleys. In the present illustration, the pair of pulleys 38 and their backup rollers 40 are mounted on arms 41, which are adjustable longitudinally by individual adjusting means 42, similar to that employed for the rollers 25, in their slide-type carriages 43. Through this adjusting means for each pulley and backing rollers, their initial positions may be set accurately relative to the centerline of the cable core individually. The carriages 26 have cam followers 35 mounted thereon and positioned in elongated arcuate cam apertures 46 in the annular element 32. Likewise, cam followers 48, mounted on the carriages 43, are positioned in elongated arcuate cam apertures 49 of the element 32, as illustrated in FIGS. 2 and 3.

The annular element 32 of all of the units 14 to 21 inclusive, have gear segments 50 mounted at like positions thereon and are interengaged by their individual pinions 51 which are fixedly mounted on a common drive shaft 52. The drive shaft 52, as illustrated in FIG. 1, has a worm gear 53 mounted thereon engaged by a worm (not shown) mounted on a shaft 55 with a hand wheel 56.

Figure 2:
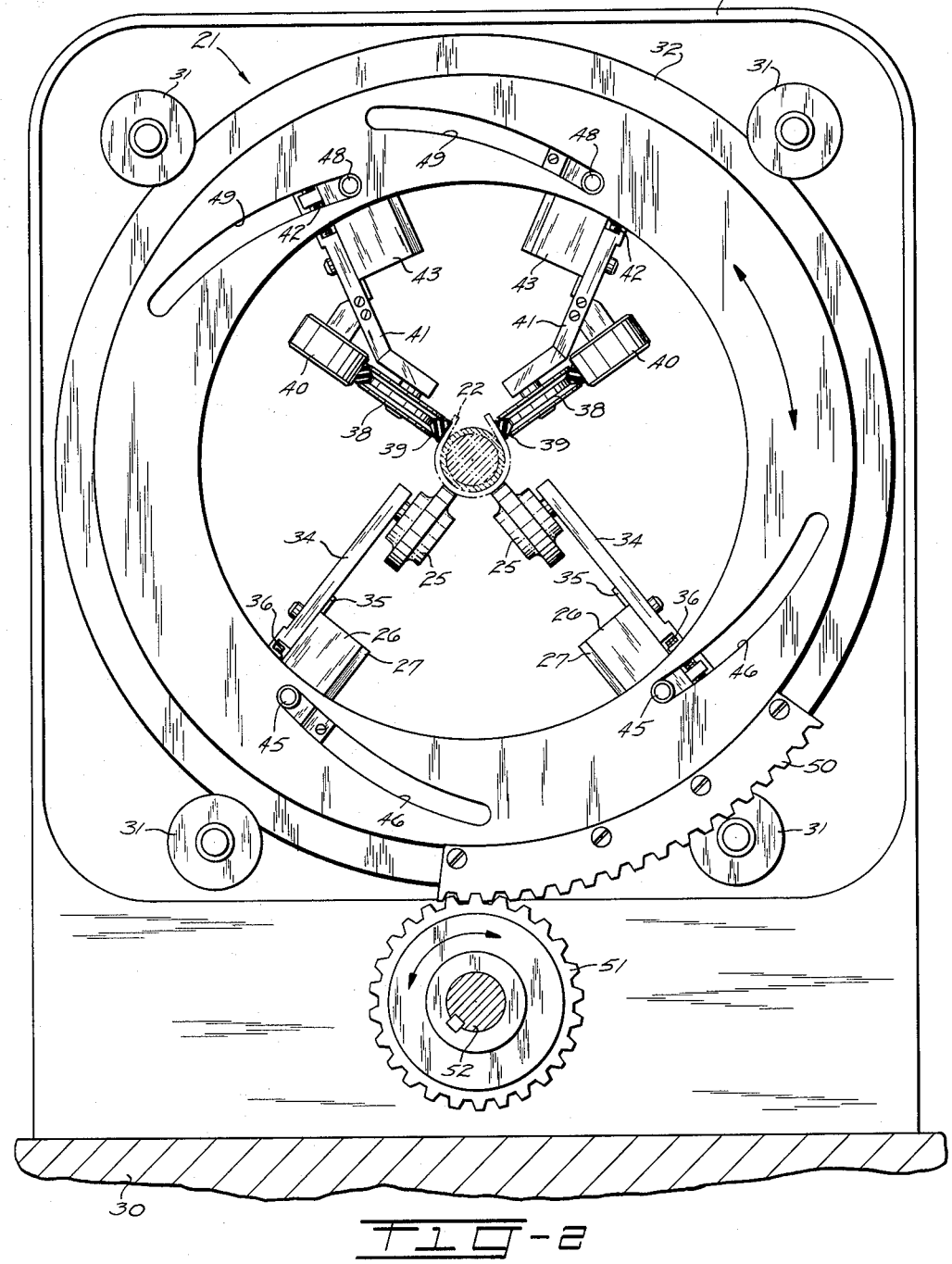
FIG. 2 is an enlarged vertical sectional view taken along the line 2—2 of FIG. 1.
Figure 3:
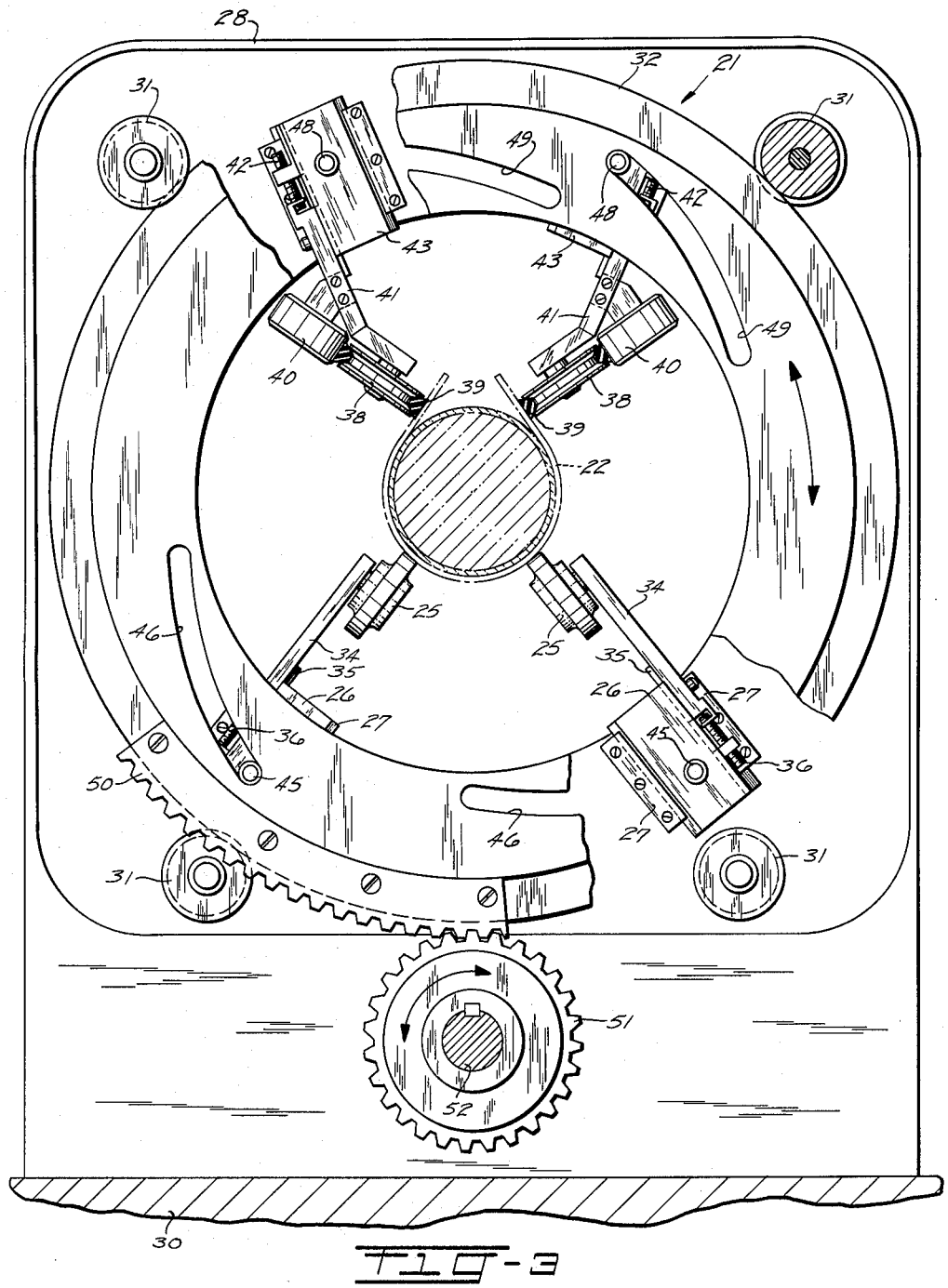
FIG. 3 is similar to FIG. 2 showing the unit opened for a larger cable core.

Referring back to the endless belts 39 only one is shown in FIG. 1, but, as seen in FIGS. 2 and 3, they are positioned upon opposing sides of the cable core 12. At the entrance end of the apparatus each belt passes around its respective main pulley 58, over its respective tensioning pulley 59, and about a drive pulley 60 located at the exit end of the apparatus. Here the pulleys 60 are driven by their respective shafts 61, only one of which is shown, these shafts being driven jointly by a single power means 62 through a gear unit 63.

Operation

In FIG. 2, the apparatus is illustrated as being set to form a sheath 22 about the smallest size cable core adaptable to be received through the units 14–21, respectively. The pair of rollers 25, in each instance, is moved to their innermost position relative to the centerline of the core, the same being true of the pulleys 38 for controlling the endless belts 39. To condition the apparatus for what may be defined the largest cable core adaptable to be received through the units 14–21, respectively, as illustrated, for example in FIG. 3, the hand wheel 56 may be rotated to rotate the shaft 52 to rotate the pinions 51 simultaneously thereby bringing about like adjustments to all of the units 14 to 21 inclusive. These adjustments simultaneously rotate the cams 32 to cause the cam portions or apertures 46 and 49 to act on the cam followers 45 of the carriages 26 and the cam followers 48 on the carriage 43 to move them outwardly like distances simultaneously in all of the units so that in a matter of a few seconds the entire apparatus may be adjusted accurately, making these same adjustments in all of the units to condition them simultaneously to receive the largest cable core. Therefore, with the illustrations in FIGS. 2 and 3, it is possible to realize that the apparatus may be adjusted for various sizes of cable cores from the smallest shown in FIG. 2 through a wide range up to the largest shown in FIG. 3. Furthermore, after the initial setting of the apparatus there need be no individual adjustments of the rollers or pulleys in any other units.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:
1. An apparatus for sheathing a cable core advanced longitudinally along a centerline of a given path with a strip of sheathing material, which comprises:
   axially aligned units fixedly mounted at spaced positions,
   first carriages located at various different positions in each of the units and capable of linear movement,
   individual pulleys supported by the first carriages, said pulleys being movable to various positions with respect to the cable centerline,
   endless belts extending through the units and passing about peripheral grooves in the pulleys for bending the strips longitudinally about the cable core,
   a rolling element connected to each first carriage for maintaining the endless belts in the peripheral groove of the pulleys,
   second carriages located at various different positions in each of the units and capable of linear movement,
   individual rollers supported by the second carriages, said rollers being movable to various positions with respect to the cable centerline,
   independent means associated with each of the first and second carriages for individually adjusting its respective pulleys and rollers thereon with respect to the cable centerline, said independent means for each carriage including a slidable arm, a supporting member connected to each carriage, and a threaded member for each carriage threadedly connected to its associated supporting member and slidable arm of each carriage for adjustably moving its respective pulley of the first carriage and roller of the second carriage a fixed distance with respect to the cable core centerline, and
   means operable for moving the first and second carriages simultaneously in all the units, prior to forming the strip about the cable core, so as to move and fixedly located the pulleys and rollers at a constant predetermined distance from the cable core centerline for forming the strip about the cable core.

2. An apparatus for sheathing a cable core according to claim 1 in which:
   the operable means includes a single drive shaft,
   means to drive the shaft in either a clockwise or counterclockwise direction, and
   cams movably mounted in the units, operatively connected to the first and second carriages and the drive shaft so that movement of the shaft in either direction will cause simultaneous movement of the cams to cause like adjustments of the first and second carriages for cable cores of various sizes.

References Cited by the Examiner
UNITED STATES PATENTS

| | | | |
|---|---|---|---|
| 890,526 | 6/1908 | Numan | 72—224 |
| 2,764,214 | 6/1956 | Reynolds et al. | 72—176 |

CHARLES W. LANHAM, *Primary Examiner.*

R. D. GREFE, *Examiner.*